United States Patent [19]
Kang et al.

[11] 3,894,976
[45] July 15, 1975

[54] PSEUDOPLASTIC WATER BASE PAINT CONTAINING A NOVEL HETEROPOLYSACCHARIDE

[75] Inventors: Kenneth Suk Kang; William H. McNeely, both of San Diego, Calif.

[73] Assignee: Kelco Company, San Diego, Calif.

[22] Filed: Nov. 30, 1973

[21] Appl. No.: 420,416

Related U.S. Application Data

[63] Continuation-in-part of Ser. No. 275,807, July 27, 1972, abandoned, which is a continuation of Ser. No. 84,165, Oct. 26, 1970, abandoned, which is a continuation of Ser. No. 854,322, Aug. 29, 1969, abandoned.

[52] U.S. Cl.. 260/17.4 ST; 195/31 P; 260/17.4 BB; 260/209 R
[51] Int. Cl............................................. C08d 9/06
[58] Field of Search ............. 260/17.4 ST, 17.4 BB; 195/31 P

[56] References Cited
UNITED STATES PATENTS

| | | | |
|---|---|---|---|
| 3,244,695 | 4/1966 | Schweiger | 260/209 |
| 3,279,934 | 10/1966 | Schuppner | 106/85 |
| 3,376,282 | 4/1968 | Schweiger | 260/17.4 |
| 3,438,915 | 4/1969 | Girard | 260/17.4 |
| 3,447,940 | 6/1969 | Halleck | 106/162 |
| 3,481,889 | 12/1967 | Gibsen | 260/17.4 |

*Primary Examiner*—Morris Liebman
*Assistant Examiner*—Edward Woodberry
*Attorney, Agent, or Firm*—J. Jerome Behan

[57] ABSTRACT

A dripless, water base paint containing a latex or rubber-like binder, a pigment, an aqueous vehicle for the pigment and binder, and a small quantity of Heteropolysaccharide-7, a novel heteropolysaccharide, in an amount sufficient to give the paint pseudoplastic properties. The paint may contain a small quantity of a water-soluble alginate in addition to the novel heteropolysaccharide. Process for forming a dripless, water base paint containing a latex or rubber-like binder, a pigment, and an aqueous vehicle for the binder and pigment. The process may include the formation of a pigment grind of the pigment in water prior to the addition of the latex binder, which comprises adding a small quantity of the novel heteropolysaccharide to the pigment grind and thereafter grinding the pigment which reduces the time required to obtain optimum dispersion of the pigment.

20 Claims, No Drawings

PSEUDOPLASTIC WATER BASE PAINT CONTAINING A NOVEL HETEROPOLYSACCHARIDE

This application is a continuation-in-part of our prior copending application Ser. No. 275,807, filed July 27, 1972, now abandoned which latter application is a continuation of Ser. No. 84,165, filed Oct. 26, 1970, now abandoned, which latter application is in turn a continuation of our application Ser. No. 854,322, filed Aug. 29, 1969, and now abandoned.

This invention relates to water base paints and more particularly to new and useful dripless water base paints hving an advantageous pseudoplastic or thixotropic body.

In general, water base paints are polymeric resin emulsions resulting from the polymerization of monomers. Such paints contain a pigment and may also contain other ingredients such as extenders; anti-forming agents; dispersion agents; freeze-thaw stabilizers; thickeners; preservatives, and the like.

In a water base paint, water takes the place of the thinner in the conventional oil base paint. when the paint is applied upon a surface in a thin film, the water evaporates, and the resinous or rubber-like materials form a continuous film, where, by oxidation, polymerization, or other reaction, the film becomes water resistant.

The formulation of a water base paint is varied to suit its conditions of use. The binder or film forming agents are rubber-like materials and, as disclosed in the paint technology literture, may vary in composition. The following synthetic plastic semi-solids are particularly well known and are used as binders or film-forming agents in commercial water base paint formulations: styrene-butadiene copolymers or polystyrene in both post and preplasticized systems, polyacrylate emulsions; polyvinyl chloride emulsions; polyvinyl acetate emulsions; and polyvinyl acetate copolymer emulsions such as vinyl ethylene-vinyl acetate copolymer, polyvinyl chloride-vinyl acetate copolymer and polyvinyl acetate-butadiene copolymer emulsions. These synthetic water base paint binders are described as both emulsions and as synthetic latexes, the latex being preferred terminology. Natural latex, although disclosed in the literature as a binder or film-forming agent in water base paints is not generally used.

Those skilled in the art of formulating water base paints appreciate the need for the improvement of their properties in such important characteristics or properties as rollability or brushability while maintaining good anti-drip characteristics; good flow and leveling to give a smooth glass-like finish; relatively uniform viscosity under changing conditions of temperature and pH; good hiding power with non-sag characteristics; good gel structure and strength; ease of manufacture; and particularly the need of a means of providing an improved water base paint composition having all or substantially all of the aforementioned desirable properties.

An object of this invention is to provide a method for producing a dripless water base paint of pseudoplastic properties which has a mayonnaise-type body when observed at rest or near rest, and when subjected to high shearing effects present in rolling or brushing motion, flows readily and spreads uniformly, i.e. has good flow and levelling properties. This latter property makes for ease of handling, storage, and particularly application in overhead jobs and other situations where a highly liquid or free-flowing paint is not desired.

It is an additional object of this invention to provide a water base paint formulation that it relatively stable to pH drift.

It is still another object of this invention to provide a water base paint formulation having good hiding power and non-sag characteristics, and which affords a paint with superior gel structure and strength.

A further object of this invention is to provide an improved process for making a paint having more uniform rheological properties and improved resistance to enzyme degradation.

A still further object is to provide a process for making such a water base paint formulation wherein the additive providing these desirable properties may be added to the paint any any stage of its compounding.

In accord with this invention, we have found that one or more of the foregoing objectives may be obtained by incorporating into a conventional water base paint formulation a novel heteropolysaccharide known as Heteropolysaccharide-7 in an amount to effective to thicken the paint and to give it the above-stated desirable properties. Suitable quantities of Heteropolysaccharide-7 from about 0.01 to about 8% by weight of the paint; a preferred range is from about 0.2 to 0.7% by weight of the paint.

Heteropolysaccharide-7 is produced by inoculating a fermentation medium with a culture of the bacteria *Azotobacter indicus var. Myxogenes* and incubating the fermentation medium at a temperature of about 25° to about 35°C. with agitation and aeration of the medium. The fermentation medium contains a carbohydrate source at a concentration of about 1 to about 5% by weight, a source of magnesium ions, a source of phosphorus, a source of nitrogen, and water; the fermentation is carried out until the residual sugar content in the fermentation medium is in the order of about 0.3% by weight or less.

The bacterium employed in the fermentation to produce Heteropolysaccharide-7 is, to our knowledge, a new bacteria. A deposit of a strain of this bacterium was made in the American Type Culture Collection on August 19, 1969, and the accession number of the Deposit is 21423. At the time of deposit this organism was identified as *Azotobacter indicus* KSI-7.

The characteristics of the bacteria, as determined by very extensive testing, are summarized as follows:

Morphology a. Cells—Gram negative, non-acid fast, nonspore forming rod of 0.3–0.6 × 0.5–1.2$\mu$ in size. Bacteria is encapsulated and produces a large amount of extracellular slime. Organism is motile having lateral multitrichous flagella. In a nitrate broth organism shows an extensive chain formation up to around 15 bacilli per chain only during the logarithmic growth period. In the stationary growth period of the incubation time organism occurs mostly in an ovoid to inflated rod shapes of 0.6–0.8 × 1.2–1.6$\mu$ in size with highly refractive bodies in the cells—usually one at each end. These bodies and cell wall component have a normal affinity to Safranine dye while the rest have very weak or no affinity at all. Consequently, organism exhibits a polar staining property on a gram stained slide. This characteristic also observed in the bacteria grown in Burk's medium.

b. Colony—The following colonial morphology is observed on the two different media.

YM plate: Shiny circular yellow colonies with a size of 2–4 mm. in diameter. Convex elevation with entire margin. Gummy colonies become a sticky waxy texture upon aging. Yellow pigment is not water soluble but soluble in alcohols. It exhibits a characteristic absorption spectrum (477:446:442 m$\mu$).

Burk's plate with glucose: Organism grows well developing into gummy colonies free of the yellow pigment. Colonies are almost transparent and circular with a size of 2–3 mm. in diameter; pulvinate elevation with entire margin. Pore growth encountered on the Burk's medium with mannitol as carbon source.

Growth Characteristics a. Nutrient broth—flocculent, slightly turbid with small amount of sediment. No odor or surface growth.
b. YM broth—flocculent, moderately turbid with scanty viscid sediment. No surface growth.
c. Nutrient agar slant—filiform growth.
d. YM agar slant—filiform growth.
e. Potato—good growth with yellow pigmentation and no darkening of potato.
f. Litmus milk—reduction of litmus, no clotting, no gas. Casein hydrolysis with clear upper layer.
g. Nitrogen source—good growth in shake flask with organic nitrogen source such as peptone, tryptone, and soy proteins. Poor growth with inorganic nitrogen such as ammonium sulfate or ammonium nitrate. The pigmentation is associated with nitrogen, particularly the inorganic source.
h. Growth temperature—grow at 20°–28°C. No growth at 40°C. The optimum temperature is around 30°C. Thermal death point is around 55°C.
i. Growth pH—grow in nutrient broth in the pH range of 4.5 to 8.7. The optimum pH is 7.0 ± 0.5.
j. Congo red absorption—colonies stained deep orange, more heavily grown area takes up less pigment, yellow—orange.

Salt Tolerance

YM broth containing:
| | |
|---|---|
| 1.0% NaCl | no growth after 3 days incubation. |
| 1.5% NaCl | no growth after 6 days incubation. |

Antibiotic Sensitivity

| | |
|---|---|
| Penicillin | not sensitive |
| Polymyxin B | not sensitive |
| Streptomycin | sensitive |
| Aueromycin | sensitive |
| Neomycin sulfate | not sensitive |
| Cyclohexamide | not sensitive |

Biochemical Characteristics

| | |
|---|---|
| Methyl red | positive |
| Catalase | positive |
| Indol formation | negative |
| Urease | negative |
| Arginase | positive (5 days, aerobic) |
| Oxidase | positive |
| Amylase | negative |
| Cellulase | positive |
| Gelatin liquefactation | negative |
| Nitrate reduction | negative |
| H$_2$S formation | positive |
| Citrate utilization | negative |
| Acetylmethyl carbinol formation | negative |

Carbohydrate Utilization in Dye's Medium at 0.5% concentration of carbohydrate using Brom-Cresol Purple Good growth in 1 day to produce acid pH:D-glucose, D-mannose, D-galactose, D-fructose; D-arabinose, D-xylose, D-sucrose, D-maltose, and D-cellobiose.

Fair growth in 1 day to produce acid pH using D-trehalose.

Poor growth in 1 day to produce alkaline pH:D-mannitol, i-inositol, and adonitol.

Good growth in 3 days to produce acid pH:D-lactose, D-raffinose, and salacin.

Fair growth in 4 days to produce acid pH using melibiose.

Fair growth in 5 days to produce weak acid pH:D-ribose, L-rhamnose, and dextrin.

Fair growth in either 2 or 5 days to produce essentially no change in pH using sodium alginate.

Effects of Amino Acids on Pigmentation

No growth with glycine, alanine, serine, valine, histidine, lysine, methionine.

Very poor growth with phenylalanine and no pigmentation.

Growth with leucine, isoleucine, cystine, and hydroxyproline to give pale yellow pigmentation; with tyrosine and citruline to give yellow pigmentation; with aspartic acid, glutamic acid and arginine to give bright yellow pigmentation.

Heteropolysaccharide-7 is produced by growing the *Azotobacter indicus var. myxogenes* organism in an aqueous nutrient medium at a temperature of from about 25°–35°C., and preferably at about 30°C. until substantial Heteropolysaccharide-7 is elaborated. The fermentation time is normally from about 35–60 hours, and preferably from 37–48 hours.

The aqueous nutrient medium, i.e., the fermentation medium, contains an appropriate source of carbon and nitrogen as well as a source of low levels of magnesium and phosphorous. The carbon source is a carbohydrate at a concentration of about 1 to 5% by weight, and preferably about 2 to 3% by weight. Suitable carbohydrates include, for example, dextrose, sucrose, maltose, fructose, mannose, starch hydrolysate or corn syrup. Preferably, the carbohydrate source employed is dextrose (glucose). Crude sugars may be used, such as deionized molasses, or a product such as Hydrol-E-081 manufactured by Cron Products Refining Company. Hydrol-E-081 is a mixture composed largely of dextrose and maltose and includes small amounts of oligosaccharides. A further ingredient which is present in the fermentation medium is a source of magnesium ions. The magnesium salt content of the fermentation medium is in the range of about 0.005 to about 0.02% by weight. The source of magnesium ions is not critical, and suitable sources include water soluble magnesium salts, such as magnesium sulfate heptahydrate, magnesium acetate, magnesium chloride, magnesium nitrate, and magnesium acid phosphate.

At least a trace quantity of phosphorus, generally in the form of a soluble potassium salt, is also present in the fermentation medium. Larger quantities of phosphorus, such as about 0.65% by weight of the fermentation medium, calculated as dipotassium-acid-phosphate, can, however, also be used without adverse effects.

A further ingredient which is present in the final fermentation medium is a source of nitrogen. The nitrogen surce may be organic in nature as, for example, soy protein; an enzymatic digest of soybean meal such as Soy Peptone, Type-T; Promosoy 100; a pancreatic hydrolysate of casein, such as N-Z amine Type A; an enzymatic digest of proteins, such as Ferm Amine Type IV, or distillers solubles, such as Stimuflav. Soy protein is sold by Nutritional Biochemical Corp., Cleveland, Ohio; Promosoy 100 is sold by Central Soya Chemurgy Division; Stimuflav is marketed by Hiram Walker & Sons, Inc., and the other materials are sold by Sheffield Chemical, Norwich, New York. When utilizing an organic nitrogen source in the fermentation medium it may be present in an amount ranging between about 0.01 and about 0.07% by weight of the fermentation medium.

Also, it has been found desirable to have present in the fermentation medium an inorganic nitrogen source, such as ammonium nitrate, ammonium chloride, ammonium sulfate or ammonium acetate. The amount of ammonium salt which may be employed can range from about 0.02 to about 0.15% by weight and preferably from about 0.045 to about 0.1% by weight of the medium.

The pH of the fermentation medium is important for suitable growth of the bacteria and elaboration of Heteropolysaccharide-7. We have found that the optimum starting pH for production of colloid is within the range of about 7 ± 0.5. Control of the pH within this range can generally be obtained by the use of a buffer compound such as dipotassium acid phosphate at a concentration from about 0.4 to about 0.6% by weight of the fermentation medium. Conversely, the pH can be controlled through conventinal means by using a pH meter coupled with a source of a suitable base, such as a solution of potassium hydroxide. As the pH is lowered due to the production of acids during the fermentation reaction, small quantities of the potassium hydroxide solution may be automatically added by the pH controller to keep the pH within the desired range.

Typically, the bacterial fermentation process of our invention under the above conditions does not require the addition of alkali to neutralize the acid throughout the entire course of the fermentation. However, the pH of the fermentation liquor does drop gradually down to about 6.0 and this generally occurs during the latter part of the fermentation (for example, if the fermentation is allowed to exceed 40 to 45 hours). However, this is considered as normal. In the event, however, that the pH should drop below 6.0 after about 35 to 40 hours of incubation, this is an indication of an abnormal fermentation and, in this case, potassium hydroxide or another suitable base such as sodium hydroxide should be added so as to maintain a pH of at least about 6.5.

In order to obtain a rapid fermentation, we have found that it is essential to have a sufficient quantity of oxygen available for the grown Azotobacter indicus var. myxogenes culture. If either too much or too little oxygen is available, the production of Heteropolysaccharide-7 by the bacterial culture is slowed down. Our process requires that sufficient oxygen be made available for the bacteria. The oxygen requirements can be defined in terms of a sulfite oxidation value, which is a measure of the rate of oxygen uptake in the fermentor under the agitation and aeration conditions employed. It is, however, preferred to describe this aspect of the process in terms of dissolved oxygen, and in this regard it is important that a dissolved oxygen level of 5–10% be maintained at least during the first 20–40 hours of the fermentation. Thus, the liquid medium should contain 5–10% of the amount of oxygen that can be dissolved in the medium, when the oxygen is added as air.

The course of the fermentation to produce our novel heteropolysaccharide may be followed by determining the residual sugar content of the fermentation medium. For best results, the fermentation is continued until the residual sugar content of the medium is in the order of about 0.3% by weight, and preferably in the order of about 0.1% by weight or less.

When the fermentation is completed, our novel Heteropolysaccharide-7 may be recovered from the fermentation liquor by known techniques, and preferably by solvent precipitation. Thus, the fermentation beer is treated with a water miscible solvent which does not react with the heteropolysaccharide and in which the product is only sligtly soluble. The product is thus precipitated and may be recovered by accepted and known techniques, and dried. Typical organic solvents which may be used for this purpose are straight or branched chain lower alkanols, i.e. methanol, ethanol, isopropanol, butanol, t-butanol, isobutanol, n-amyl alcohol of which is isopropanol is the preferred alcohol; lower alkyl ketones, such as acetone, may be employed. In some cases the precipitation is improved if the fermentation medium is first heated to a temperature of about 70°–90°C. for a short period of time and then cooled to about room temperature before addition of the solvent.

The novel Heteropolysaccharide-7 obtained as described above is a high molecular weight polysaccharide that functions as a hydrophilic colloid thicken, suspend and stabilize water based systems. It is slightly soluble in lower alkanols and acetone. The carbohydrate portion of the molecule consists of about 73% of glucose, about 16% of rhamnose and about 11% of a uronic acid (all by weight). Thus, the glucose, rhamnose, uronic ratio may be expressed as 6.6:1.5:1.0. It has an acetyl content of about 8.0–10.0%.

A more detailed description of our Azotobacter indicus var. myxogenes, of the method of growing it to produce Heteropolysaccharide-7, and of the novel heteropolysaccharide itself appears in our copending application Ser. No. 403,748, filed Oct. 5, 1973, which application is incorporated by reference herein. Said Ser. No. 403,748 is a continuation-in-part of copending application Ser. No. 239,819 now abandoned, which is in turn a continuation of Ser. No. 854,322, filed Aug. 29, 1969 and now abandoned.

In forming water base paints which contain an effective quantity, e.g., about 0.01 to about 2% by weight of the paint, of the heteropolysaccharide of the invention to thicken said paint, the paint contains an aqueous emulsion latex composition containing a resinous film forming agent and a pigment. The paint may also contain other ingredients such as extenders, anti-foaming agents, dispersion agents, freeze-thaw stabilizers and preservatives. The binder may, for example, be any of the known synthetic plastic semi-solids such as styrene-butadiene copolymers, polystyrene in both post and preplasticized systems, polyacrylate emulsions and polyvinyl acetate emulsions. The paint will contain a pigment, as stated above, which, for example, may be finely divided titanium dioxide, lithopone, zinc oxide, and the like are also used and usually in combination with extenders such as mica, talc, china clay, barium sulphate, calcium carbonate, dolomite, calcium silicate, silica, and diatomaceous earth. To such pigment, colors may be added such as organic pigments, iron oxide, chromic oxide, carbon black, sienna, umber, and ochre.

Water base paints may also include quite a variety of wetting or dispersing agents such as polyphosphates, pyrophosphates, anionic and non-ionic surfactants, polyacrylates, polymethacrylates, polyvinyl alcohol, polyethylene-glycol. Additional ingredients include freeze-thaw stabilizers such as ethylene glycol, diethylene glycol, and non-ionic surfactants; and preservatives such as organo-mercuric and organo-tin compounds, alkylated, halogenated or arylated phenols and their derivatives, antibiotics and many others. Still other ingredients may be included in water base paint formulae which are materials known as foam breakers, e.g. silicones, ditertiary acetylenic glycols, long chain ethylene oxide condensates, tributyl phosphate, pine oil, and higher aliphatic alcohols. Water base paints including the heteropolysaccharide in accordance with our invention, to impart the novel properties hereinbefore described, may also include such materials as starch, casein, methyl cellulose, hydroxy ethyl cellulose, vegetable gum, and the like.

In preparing a water base paint, a factor that is considered is the pigment volume concentration, expressed as % PVC, which is the concentration by volume of the pigment expressed as a percentage of the total volume of solids of the paint. Stated otherwise the pigment volume concentration (% PVC) is the volume occupied by the pigment divided by the volume solids of the pigment plus the binder expressed as a percentage. The percentage of pigment and extender in the volume concentration will vary depending upon the use to which the paint is to be put. Thus, for example, in a flat paint the pigment including any extender used will be in the range of 40 to 70%; in a semi-gloss paint, 20 to 30%; and in a gloss paint, 5 to 20% by weight of the total paint system. As mentioned, the balance of the make-up of the pigment volume concentration is the binder. Thus, in a gloss paint there would be the largest percentage of binder; in a semi-gloss a smaller amount of binder; and in a flat paint, a still smaller amount of binder. The water content of a water base paint varies widely depending on the other ingredients therein and intended use of the paint. For example, water may be present in an amount from 20 to 60% of the weight of the finished paint.

The addition of Heteropolysaccharide-7 to the pigment grind has been found to assist greatly in the dispersing of the pigment. To illustrate, it was found that the addition of the novel Heteropolysaccharide-7 to the pigment grind reduces the time required to obtain optimum dispersion by as much as 30% or more.

The dispersing characteristics of Heteropolysaccharide-7 permit formualtion of paints according to our invention while using substantially less or no surfactant as is required generally in paints to disperse the pigment. Through reduction of the surfactant content, paints can be produced which have improved resistance to tear dropping, i.e., leaching of the surfactant to paint surface to give an unsightly film which is very difficult to remove.

In one of the preferred embodiments of our invention, the water base paint contains Heteropolysaccharide-7, as defined previously, in admixture with a water-soluble alginate. Suitable alginates include sodium alginate, potassium alginate, and ammonium alginate. Preferably, the alignate employed has a viscosity of about 50 to about 1,800 cps. in a 1% deionized water solution as measured with a Brookfield Viscometer, Model LVF, using a No. 3 spindle at 60 R.P.M. and a temperature of about 77°F.

We have found that the use of a mixture of Heteropolysaccharide-7 and an alginate in a water base paint increases the wet edge of the paint during either application or touch-up and also provides a paint having better flow and leveling properties. The relative quantities of Heteropolysaccharide-7 and a water-soluble alginate can be varied depending upon the properties desired in the paint. In general, satisfactory paints are obtained when using a weight ratio of said heteropolysaccharide to water-soluble alginate in the range of about 3 to 1 to about 1 to 3.

We have also found that the use of a water-soluble alginate in combination with Heteropolysaccharide-7 generally permits the use of a higher content of the heteropolysaccharide in the finished paint. When using a mixture of Heteropolysaccharide-7 with finely divided high viscosity sodium alginate, improved properties can be attained in the finished paint by employing larger quantities of the heteropolysaccharide such as about 3 pounds per 100 gallons of the finished paint. The use of about 2 pounds of the heteropolysaccharide per 100 gallons of finished paint gives the optimum properties when Heteropolysaccharide-7 is used with sodium alginate in the above weight ratios.

When using a water-soluble alginate in our paints, it is frequently desirable to employ also a sequestering agent such as a molecularly dehydrated phosphate salt, e.g., sodium hexametaphosphate, tetrasodium pyrophosphate, sodium tripolyphosphate, and the similar potassium phosphates. The sequestering agent can be employed in varying minor amounts depending on the hardness of the water used in making the paint so as to prevent precipitation of the water-soluble alginate. Frequently, it is desirable to add the sequestering agent to the pigment grind.

It is advantageous to add at least a portion of the Heteropolysaccharide-7 to the pigment grind. The various pigments employed in the paint are generally ground in a mixer, such as a Cowless Dissolver prior to addition of the paint binder which is mixed to form the finished paint. The presence of Heteropolysaccharide-7 in the pigment grind assists in the dispersing of the pigment. The concentration of heteropolysaccharide in the pigment grind may range up to about 12 lbs. per 100 gallons of the pigment grind but preferably ranges up to about 2 pounds per 100 gallons of the pigment grind.

Any additional Heteropolysaccharide-7 used in the paint (in addition to that added to the pigment grind) is generally in the form of an aqueous presolution in combination with any water-soluble alginate which may be used in the paint. The aqueous presolution is generally added prior to the the addition of the paint binder. This generally provides better dispersion of the heteropolysaccharide in the finished paint and produces paints having more uniform viscosity characteristics. After the presolution of the Heteropolysaccharide-7 has been blended into the pigment grind, the paint binder is then added and mixed in.

As an example of our invention we incorporated a small amount of Heteropolysaccharide-7 into a water base paint formulation. The water base paint so produced was improved in that the heteropolysacchride imparted a rheology that is non-Newtonian and very pseudoplastic, e.g., the apparent viscosity of the material is very much higher under low shear rates than at high shear rates. Still further, the paint so produced had a mayonnaise type of body when observed at rest or near rest in the can or on the brush. This property made the paint resistant to dripping from the brush and splashing from the can. However, when we subjected the water base paint made in accordance with our invention to the higher shearing effects produced by rolling or brushing motion, the consistency of the paint changed drastically and it flowed readily. In our paints, the flow properties can be controlled to the desired amount by the quantity of Heteropolysaccharide-7 which is added.

To further illustrate our invention, there are presented the following examples in which all parts and percentages are by weight unless otherwise indicated.

EXAMPLE I

A 2% aqueous solution of Heteropolysaccharide-7 was formed by stirring finely divided Heteropolysaccharide-7 in water for about 2 hours at room temperature. There was then added an equal weight of a 44–45% by weight aqueous acrylic latex emulsion which was obtained from Rohm & Haas Co. as Rhoplex AC-22. After mixing until homogeneity was obtained, the initial viscosity was measured at about 25°C. by a Brookfield Viscometer, Model LVF, having a spindle speed of 60 R.P.M. and found to be 4,550 centipoises (cps.). Following this, the composition was divided into two samples, one of which was stored for two months at room temperature and the other of which was stored for 2 months at 110°F. The stability of the composition was determined by observation of its properties during storage at room temperatures and at 110°F. The stability of the composition was determined by the presence of the following factors: no gellation, no separation, smooth flow and no pigment flocculation. Based on these factors, observation of the paint formulation showed it to be stable during storage.

EXAMPLE II

A paint formulation was made up in the same manner as that of Example I by employing a 55% by weight aqueous emulsion of polyvinyl acetates in lieu of the aqueous acrylic emulsion. The polyvinyl acetate emulsion was obtained from Reichold Chemical Company as Wallpol 40-125. The initial viscosity of the paint formulation, measured with a Brookfield Viscometer, Model LVF, at about 25°C., was 3,500 cps. After storage of the paint for 2 months at room temperature, its viscosity at 25°C. was 3,620 cps and the viscosity of the paint stored at 110°F. was 2,060 cps. Applying the criteria set forth in Example I, the paint formulation was observed and found to be stable during storage.

EXAMPLE III

A paint formulation, as set forth in Example I, was made up by employing a 50% by weight aqueous emulsion of styrene-butadiene in lieu of the 44–45% by weight acrylic emulsion. The styrene-butadiene emulsion was obtained from Goodyear Chemical Company as Pliolite. After mixing to homogeneity, the initial viscosity of the paint formulation at about 25°C. was found to be 4,150 cps. After storage for 2 months at room temperature, the viscosity of the formulation at about 25°C. was 4,300 cps. The sample which was stored for 2 months at 110°F. had a viscosity of 4,900 cps at about 25°C. as measured with a Brookfield viscometer, Model LVF, having a spindle speed of 60 R.P.M. This paint formulation, on the basis of the above observations, was found to be stable during storage.

EXAMPLE IV

As a basis for comparison with the paints described in Examples I–III, two paints were prepared in which the thickener was ethylhdroxy ethylhydroxy cellulose. The first formulation contained a 2% aqueous solution of ethylhydroxy ethyl cellulose in admixture with an equal weight of a 44–45% by weight acrylic latex emulsion (Rhoplex AC-22 supplied by Rohm & Haas). After mixing to homogeneity, the initial viscosity of the formulation, measured with a Brookfield Viscometer, Model LVF, at about 25°C., was 2,700 cps. After storage of a paint sample for 2 months at room temperature, its viscosity was again measured and found to be 1,090 cps. A second sample was stored for 2 months at 110°F. and its viscosity at about 25°C. was 6,090 cps. This particular paint formulation underwent phase separation during the 2 months of storage at room temperature. A second paint was prepared by mixing a 2% solution of ethylhydroxyl ethyl cellulose with an equal weight of a 55% by weight aqueous emulsion of polyvinyl acetates (supplied by Reichold Chemical Company as Wallpol 40-125). After mixing to homogeneity, the initial viscosity of the paint formulation as 2,640 cps. and after storage of a sample at room temperature for 2 months, its viscosity was found to be 1,750 cps. A second sample which was stored for 2 months at 110°F. had a viscosity of 490 cps. at 25°C. using a Brookfield Viscometer, Model LVF. This paint was unstable in that it underwent phase separation during the 2 months' storage at 110°F.

On comparing the results of Example IV with those of Examples I–III, it will be observed that the paint formulation of the invention containing the Heteropolysaccharide-7 in admixture with various paint latices had greater stability than corresponding formulations which contained ethylhydroxyl ethyl cellulose as a thickener. Ethylhydroxy ethyl cellulose was chosen as a basis for comparison because it is typical of cellulosic thickeners employed in water emulsion based paints, such as methyl cellulose and carboxymethyl cellulose. Further, ethylhydroxy ethyl cellulose is the most generally used thickener for water emulsion based paints at this time and is recognized in the paint industry as a standard for thickeners. The particular ethylhydroxyl ethyl cellulose employed was obtained from Union Carbide Company as Cellusize OP 4400.

The lack of stability of paints thickened with ethylhydroxy ethyl cellulose may be due to either enzymatic degradation, thermal degradation or reactivity of the cellulose with other components of the paint-system. Cellulosic-thickened paints are known to be susceptible to degradation from either heat or enzymatic action. In contrast, our paints which contain Heteropolysaccharide-7 are stable to both heat and enzymatic action and are also compatible with materials commonly used in latex emulsion paints.

EXAMPLE V

A paint was prepared by mixing the following ingredients in the order indicated. Ingredients 1 through 5 were added to water in a Cowless Dissolver operating at moderate speed and each ingredient was blended in until smooth before the next ingredient was added. After ingredient 5 had been added, the mixture was dispersed for twenty minutes at high speed which ingredients 6, 7, 8, 9 and 10 were added in the order listed and were blended in at low speed until a smooth paint was obtained. The qualtities of the ingredients listed are in pounds per 100 gallons of paint.

|  |  |  |
|---|---|---|
|  | Water | 66 lbs. per 100 gallons |
| 1. | Microbiocide containing 21% by weight of Di(phenylmercuric) dodecenyl succinate and 79% inerts (Super Ad It obtained from Tenneco Chemicals, Inc.) | 0.5 lbs. |
| 2. | Sodium salt of polymeric carboxylic acid (Tamol 731 – 25% of the salt and 75% inerts –supplied by Rohm & Haas Company) | 11.0 lbs. |
| 3. | Anti Foam (Nopco NDW, Nopco Chemical Company | 1.0 lbs. |
| 4. | Propylene Glycol | 180.0 lbs. |
| 5. | Rutile Titan Dioxide (TiPure R-900-Pigments Division, E.I. DuPont) | 275.0 lbs. |
| 6. | Anti Foam (Nopco NDW-Nopco Chemical Company) | 1.0 lb. |
| 7. | 44–45% by weight aqueous acrylic latex emulsion (Rhoplex AC-22 Rohm & Haas) | 440.0 lbs. |
| 8. | 44–45% by weight aqueous acrylic latex emulsion (Rhoplex AC-61 Rohm & Haas Company) | 106.0 lbs. |
| 9. | 64% of dioctyl sodium sulfosuccinate in light petroleum distillate solution – supplied as Triton GR-7 by Rohm & Haas Company) | 2.0 lbs. |
| 10. | 2% aqueous solution of Heteropolysaccharide-7. | 50.0 lbs. |

After mixing the above paint, it was allowed to stand for 24 hours; its viscosity was then 83 krebs units at about 77°F. The paint was allowed to stand for an additional 9 days — a total of 10 days — and its viscosity was measured and found to be 86 krebs units at about 77°F. The paint was brushed out on a Morest Card. After brushing out, the paint was allowed to dry for 24 hours and the 60° gloss of the paint was measured using a Gradner Gloss Meter (ASTM Method D-523) and found to be 52 units.

The paint was applied to a Morest Card with a draw bar to the uniformly thick layer 3 mils dry film. After the paint had dried for 24 hours, the 60° gloss was determined and found to be 54 units. The flow and leveling properties of the paint were determined and found to be fair. To determine flow and leveling, the paint is brushed out on a card at a spreading rate of approximately 500 square feet per gallon. The paint is applied by first brushing the card in one direction using a 2-inch nylon brush followed by brushing the paint on the card in a direction at right angles to the original direction of brushing. Following this, the paint is feathered out by brushing all of the paint in one directin. The paint is then allowed to dry. During the application of the paint, its viscosity decreases due to the applied shear. Following brushing the paint flows together to even out the brush marks and the viscosity of the paint increases. The degree of time delay required for the viscosity of the paint to increase determines the flow and leveling properties of the paint and is indicated by the ability of the paint to flow together to even out brush marks without excess flow to distort the uniform film appearance. If, for example, the paint immediately increased in viscosity after brushing, it would be too viscous to flow together and even out the brush marks. Conversely, if there was too great a time delay for the viscosity of the paint to increase, the paint would flow too much with the result that the paint film would not have a uniform appearance.

A paint is rated in regard to its flow and leveling properties by the degree to which brush marks are visible in the dried paint film. If there are essentially no brush marks, the paint is rated excellent while if there are a few brush marks, it is rated good. If there are more brush marks, it is rated fair and if there are many brush marks, it is rated poor.

EXAMPLE VI

A paint was prepared using the same ingredients and procedure described in Example V with the exception that 500 lbs. of a 44–45% by weight aqueous acrylic emulsion (Rhoplex E-490 supplied by Rohm & Haas Company) was employed in lieu of the 546 pounds total of the acrylic emulsions denoted 7 and 8 in Example V. After mixing of the paint in the manner described in Example V, the paint was allowed to settle for 24 hours and its viscosity was 86 krebs units. After settling for an additional 6 days — a total of 7 days — the viscosity of the paint was 86 krebs units. The 60° gloss of the paint after brushing out on a Morest Card was 65 units and the flow and leveling properties of the paint were determined in the manner described in Example V and found to be fair.

EXAMPLE VII

A flat wall paint was prepared by mixing the following ingredients in the order indicated.

Ingredients 1–10 were added sequentially to water in a Cowless Dissolver operating at moderate speed and each ingredient was blended in until smooth before the next ingredient was added. After adding ingredient 10, the mixture was dispersed for 20 minutes at high speed after which ingredients 11, 12 and 13 were added in the order listed and blended in at low speed until a smooth paint was obtained. The quantities of ingredients are in pounds per 100 gallons of paint:

|  |  |  |
|---|---|---|
| 1. | Water | 160 lbs. |
| 2. | Sodium salt of polymeric carboxylic acid (TAMOL-731-25% active, supplied by Rohm & Haas Company) | 14 lbs. |
| 3. | Benzyl ether of octyl phenol ethylene oxide adduct – 100% active (Triton CF-10, Rohm & Haas Company) | 2 lbs. |

-Continued

| | | | |
|---|---|---|---|
| 4. | Anti Foam (Nopco NXZ, Nopco Chemical Company) | 2 | lbs. |
| 5. | Ethylene Glycol | 10 | lbs. |
| 6. | Hexylene Glycol | 30 | lbs. |
| 7. | Microbiocide containing 21% by weight of Di(phenylmercuric) dodecenyl succinate and 79% inerts - (Super Ad It, Tenneco Chemicals Inc.) | 1.0 | lb. |
| 8. | Rutile Titanium Dioxide (TiPure R-901 - Pigments Division, E.I. DuPont) | 300 | lbs. |
| 9. | Aluminum Silicate clay (Optiwhite, Burgess Pigment Co.) | 86 | lbs. |
| 10. | Silica (1160 Silica - Illinois Minerals Co.) | 57 | lbs. |
| 11. | Anti Foam (Nopco NXZ - Nopco Chemical Company) | 2 | lbs. |
| 12. | 44-45% by weight aqueous acrylic emulsion (Rhoplex AC-22 Rohm & Haas Company) | 397 | lbs. |
| 13. | 2% aqueous solution of Heteropolysaccharide-7. | 100 | lbs. |

After formulating the paint as set forth above, the paint was permitted to age for 48 hours. Following this, its viscosity was determined and found to be 97 krebs units. After aging for a total time of 4 months, the viscosity of the paint was determined and found to be 104 krebs units.

The paint was sheared and drawn down with a New York leveling bar to give a leveling rating of 0.5. When brushed out in the manner described in Example V, the paint was observed for flow and leveling and was rated fair.

EXAMPLE VIII

A paint was prepared by mixing the following ingredients in the order indicated in which ingredients 1-6 were sequentially added to a Cowles mixer operating at moderate speed. Each ingredient was blended in until smooth before the next ingredient was added. After ingredient 6 had been added, the mixture was dispersed at high speed and ingredient 7 was added and the mixture was dispersed for 30 minutes at high speed. Following this, ingredients 8-11 were added in the order listed and blended in at low speed until a smooth paint had been obtained. The qualtities of the ingredients shown are in pounds per 100 gallons of paint.

| | | | |
|---|---|---|---|
| 1. | Water | 116 | lbs. |
| 2. | Phenyl mercuric propionate (Metasol 57 Metasol Division of Merck & Co., Inc.) | 0.13 | |
| 3. | Sodium salt of polymeric carboxylic acid (Tamol 731 - 25% active - Rohm & Haas Company) | 11 | |
| 4. | Anti Foam (Nopco NDW - Nopco Chem. Company) | 1 | |
| 5. | Propylene glycol | 180 | |
| 6. | Heteropolysaccharide-7 | 0.75 | |
| 7. | Rutile Titanium Dioxide (Titanox CLNC - Titanium Pigments Co.) | 250 | |
| 8. | 44-45% by weight aqueous acrylic latex emulsion (Rhoplex AC-22, Rohm & Haas Company) | 415 | |
| 9. | 44-45% by weight aqueous acrylic latex emulsion (Rhoplex AC 61, Rohm & Haas Company) | 103 | |
| 10. | Anti Foam (Nopco NDW, Nopco Chemical Co.) | 2 | |
| 11. | 64% active Dioctyl - sodium sulfosuccinate in light petroleium distillate solution (Triton GR-7, Rohm & Haas Company) | 2 | |

The total number of pounds of ingredients present in the above paint formulation was 1,081 lbs., which gave approximately 103 gallons of paint having a weight per gallon of about 10.50 lbs. with about 45% of non-volatiles by weight. The initial viscosity of the paint was 70 krebs units and after aging for 10 days, the viscosity was 78 krebs units. The 60° gloss of the paint, as applied to a Morest Card with a draw bar giving a uniformly thick layer of 3 mils dried film was 55 units after 3 days of drying at ambient temperature. The reflectance of the paint was 90.3%. Reflectance is a percentage which is determined by measuring the reflectance of a surface covered with the paint which is illuminated from a direction which is 60° from the perpendicular to the test surface, as viewed from within 30° of and centered about the perpendicular to the test surface. The reflectance of the paint surface under test is expressed as a percentage with respect to the reflectance of an ideal completely reflecting and perfectly diffusing surface, such as a freshly smoked surface of magnesium oxide prepared according to the instructions in National Bureau of Standards Circular LC 547(1939). The flow and leveling of the paint, after application to the test surface in the manner prescribed in Example V at an application rate of approximately 400 square feet per gallon was rated good to excellent on the basis of visual appearance.

EXAMPLE IX

A paint was prepared using the same ingredients and procedure as described in Example VIII with the exception that 196 lbs. of added water, 100 lbs. of propylene glycol and 1.0 lb. Heteropolysaccharide-7 were employed in lieu of the quantities set forth in Example VIII. After making of the paint in the manner described in Example VIII, about 103 gallons of paint were obtained having a total weight of about 1,081 lbs. or a weight per gallon of about 10.4 lbs. The percentage of non-volatiles was about 45 and the paint had an initial viscosity of 75 krebs units. After 10 days, the paint had a viscosity of 83 krebs units. The paint had a 60° gloss of 64 units after a 3 mil dry film draw down and 3 days of drying and had good flow and leveling properties after application at a rate of about 400 square feet per gallon.

EXAMPLE X

A paint was prepared using the same ingredients and procedure as in Example VII with the exception that it contained 196 lbs. of added water, 100 lbs. of propylene glycol, 1 lb. of Heteropolysaccharide-7 and 550 lbs. of 44-45% aqueous acrylic emulsion (Rhoplex AC-22, Rohm & Haas Company), in lieu of the quantities used in Example VIII. After mixing of the paint, approximately 107 gallons were obtained having a total weight of about 1,113 lbs., or a weight per gallon of about 10.4 lbs. The percentage of non-volatiles was about 46% by weight and the initial viscosity was 73 krebs units. After aging for 10 days at room temperature, the paint had a viscosity of 81 krebs units. This paint had a 60° gloss of 67 units and the flow and leveling properties of the paint at an application rate of about 400 square feet per gallon were rated fair to good.

EXAMPLE XI

A paint was prepared by mixing the following ingredients in the order indicated. Ingredients 1 through 8 were added sequentially to a Cowles Dissolver operating at moderate speed. After ingredient 8 has been added, the mixture was ground for 10 minutes at high speed. Thereafter, ingredients 9–12 were added in the order indicated while the mixer was operating at high speed. After ingredient 10 had been added, the mixture was ground for 10 minutes at high speed. Following this, ingredients 11 through 14 were added while the mixer was operating at low speed and each was blended in until smooth. The quantities of the ingredients are set forth in pounds per 100 gallons of paint.

| | | | |
|---|---|---|---|
| 1. | Water | 290 | lbs. |
| 2. | Microbiocide (Super Ad-It) | 1 | lb. |
| 3. | Potassium tripolyphosphate | 1.5 | lbs. |
| 4. | Sodium salt of a polymerized carboxylic acid (Daxad 30, Dewey and Almy Chemical Company) | 6.0 | lbs. |
| 5. | Water dispersed lecithin (Kelicin 1081, Spencer Kellogg Div. of Textron) | 5.0 | lbs. |
| 6. | Ethylene glycol | 28.0 | lbs. |
| 7. | Deefo 233 (Defoamer) Ultra Adhesives Inc., Patterson, N.J. | 2.0 | lbs. |
| 8. | Rutile Titanium Dioxide (Tronox 813, P.P.G. Industries) | 200.0 | lbs. |
| 9. | Clay (Atomite, Thompson-Weimann & Co.) | 75.0 | lbs. |
| 10. | Calcium carbonate extender | 50.0 | lbs. |
| 11. | Delaminated Aluminum Silicate (Kaopaque 6, Georgia Kaolin Co.) | 75.0 | lbs. |
| 12. | Modified Aluminum Silicates (Alto White LL, Georgia Kaolin Co.) | 50.0 | lbs. |
| 13. | 55% by weight Polyvinyl Acetate latex emulsion (Resyn 2345, National Starch Chemical Company) | 276.0 | lbs. |
| 14. | 2,2,4-Trimethylpentanediol-1,3-monoisobutyrate (Texanol, Eastman Chemical) | 8.0 | lbs. |
| 15. | Deefo 233, Defoamer | 2.0 | lbs. |
| 16. | 2% aqueous solution of Heteropolysaccharide-7. | 100.0 | lbs. |

The above paint, as formulated, weighed about 1,170 lbs., about 52% by weight of nonvolatiles and a theoretical weight per gallon of 11.7 lbs. The initial viscosity of the paint was 79 krebs units. The brushing qualities of the paint were excellent and it had good flow and leveling properties. The sheen of the paint was flat. After 36 hours storage at ambient temperature, the viscosity of the paint was 79 krebs units. The flow and leveling properties were rated good and it had a flat uniform sheen.

As illustrated in Examples VIII and XI, the heteropolysaccharide described previously may be added to the pigment grind prior to addition of the paint binder or may be added during the letdown phase of the formulation procedure along with the binder. If added to the pigment grind, as illustrated in Example VIII, the presence of Heteropolysaccharide-7 has been found to assist the uniform dispersion of the pigment such that less time is generally required for dispersion.

EXAMPLE XII

A semigloss enamel was made up by mixing ingredients 1–6 in the order indicated in which the ingredients were sequentially added to a Cowless Dissolver operating at moderate speed. After ingredient 6 has been added and blended in, the mixture was ground for 10 minutes at high speed. Following this, ingredients 7–10 were added in the order indicated while the mixer was operating at low speed. The quantities of ingredients shown are in pounds:

| | | |
|---|---|---|
| 1. | Water | 108 lbs. |
| 2. | Sodium salt of polymeric Carboxylic acid (Tamol 731, 25% active, Rohm & Haas Company) | 11 lbs. |
| 3. | Microbiocide (Super Ad It - Tenneco Chemicals Inc.) | 1 lb. |
| 4. | Anti Foam (Nopco NDW - Nopco Chemical Company) | 2 lbs. |
| 5. | Propylene glycol | 180 lbs. |
| 6. | Rutile Titanium Dioxide (TiPure R-900, Pigments Division, E.I. DuPont) | 275 lbs. |
| 7. | 44–45% by weight aqueous acrylic latex emulsion (Rhoplex AC-490, Rohm & Haas) | 550 lbs. |
| 8. | Anti Foam (Nopco NDW - Nopco Chemical Company) | 4 lbs. |
| 9. | Anionic Type wetting agent 62% active (Triton GR-7, Rohm & Haas Company) | 2 lbs. |
| 10. | 2.5% by weight aqueous solution of Heteropolysaccharide-7. | 25 lbs. |

The above paint had an initial viscosity of 77 krebs units, a viscosity after 7 days at room temperature of 80 krebs units, and a viscosity after 14 days at room temperature of 80 krebs units. The initial 60° gloss of the paint was 52 units. Here, as in Example XI, addition of the heteropolysaccharide as the last ingredient in the formulation procedure results in a paint having a good properties.

EXAMPLE XIII

A paint was prepared using the same ingredients and the same order of mixing as in Example VII with the exception that the 2% aqueous colloid solution contained 2% by weight of a blend of Heteropolysaccharide-7 with a high viscosity sodium alginate at a weight ratio of 60 parts of the heteropolysaccharide to 40 parts of the alginate. The high viscosity sodium alginate is one having a viscosity in the order of about 800 centipoises at a 1% concentration in aqueous media as measured with a Brookfield Viscometer, Model LVF, at 60 R.P.M. and about 77° F. The resulting paint had a viscosity of 102 krebs units after 48 hours and a viscosity of 104 krebs units after aging for 4 months at ambient temperatures.

The paint had brushout properties which were rated fair to good and gave a flow and leveling rating of 1.0 using a New York leveling bar.

EXAMPLE XIV

A paint was prepared using the same ingredients and order of mixing as in Example V with the exception that ingredient 10 comprised 50 lbs. of an aqueous solution containing 2% by weight of a 60:40 weight ratio mixture of Heteropolysaccharide-7 in combination with high viscosity sodium alginate. The resulting paint had a viscosity after aging for 24 hours at ambient temperature of 83 krebs units and a viscosity after 11 days under the same conditions of 86 krebs units. The 60° gloss of the paint, after brush dry out and drying for 24 hours at ambient temperature was 45 units and after draw down, and drying in the same manner, was 46 units. The flow and leveling properties of the paint were rated good, based on observation.

EXAMPLE XV

A paint was prepared using the same ingredients and order of mixing as in Example VI with the exception that ingredient No. 10 comprises 50 lbs. of an aqueous solution containing 2% by weight of a 60:40 weight mixture of Heteropolysaccharide-7 in combination with a high viscosity sodium alginate. The resulting paint had a viscosity after 24 hours of 86 krebs units, and a viscosity after 7 days of 86 krebs units. The 60P gloss after brush out and drying for 24 hours was 59 units and the flow and leveling properties of the paint were observed and rated good.

EXAMPLE XVI

A vinyl acrylic flat paint was formulated by sequentially mixing the listed ingredients 1 through 8 in a Cowless Dissolver operating at a moderate speed and thereafter grinding for 10 minutes at a high speed. Ingredients 9–11 were than added sequentially and blended in after which the mixture was ground for an additional 10 minutes at high speed. The mixer speed was then reduced to low speed and ingredients 11–17 were added sequentially with each blended in until smooth. The weights of the ingredients given are in pounds per 100 gallons of paint.

| | | | |
|---|---|---|---|
| 1. | Water | 216 | lbs. |
| 2. | Microbiocide (Super Ad-It) | 1 | lb. |
| 3. | Potassium tripolyphosphate | 1.5 | lbs. |
| 4. | Dispersant (Daxad 30; Dewey and Almy Chem. Div.) | 6 | lbs. |
| 5. | Water-dispersible Lecithin (Spencer Kellogg Div. of Textron) | .5 | lbs. |
| 6. | Defoamer (Deefo 97-2, Ultra Adhesives Co.) | 2 | lbs. |
| 7. | Ethylene glycol | 28 | lbs. |
| 8. | Titanium Dioxide (Tronox CR-813, P.P.G. Industries) | 200 | lbs. |
| 9. | Calcium Carbonate (Duramite-Thompson, Weimman & Co.) | 150 | lbs. |
| 10. | Aluminum Silicate (Hydrite Flat D, Georgia Kaolin Co.) | 75 | lbs. |
| 11. | Aluminum Silicate (Glomax LL, Georgia Kaolin Co.) | 50 | lbs. |
| 12. | Resyn 2345 (National Starch Co.) | 273 | lbs. |
| 13. | Deefo 97-2 | 2 | lbs. |
| 14. | Texanol (Eastman Chemical) | 8 | lbs. |
| 15. | 2.5% by weight aqueous solution of a high viscosity sodium alginate (Kelgin F-Kelco Co.) | 70 | lbs. |
| 16. | An aqueous solution containing 2% by weight of Heteropolysaccharide-7 | 100 | lbs. |
| 17. | 2-Amino-2-methyl-1-propanol (AMP, Commercial Solvents Corp.) | 2 | lbs. |

The total weight of the paint was 1,189.5 lbs. Its initial viscosity was 80 krebs units and after 10 days at ambient room temperature, the viscosity of the paint was measured and found to be 84 krebs units.

The above data further demonstrates the ability of a paint of our invention containing a polyvinyl acrylate binder and Heteropolysaccharide-7. As shown, the viscosity of the paint was essentially unchanged after aging for 5 weeks.

EXAMPLE XVII

A semigloss paint was formulated by blending the following ingredients in the order listed in pound quantities. Ingredients 1 through 6 were added to a Cowless Dissolver and each ingredient was blended in until smooth before the next ingredient was added. After the sixth ingredient was added, the mixture was ground for 20 minutes at high speed. Following this, ingredients 7–10 were added in the order indicated while the Cowless Dissolver was operating at low speed and each ingredient was blended in until smooth before the next ingredient was added.

| | | | |
|---|---|---|---|
| 1. | Water | | 91 lbs. |
| 2. | Microbiocide (Super Ad-It Tennaco Chemicals) | | 1 lb. |
| 3. | Sodium salt of polymeric carboxylic acid, 25% active (Tamol, 731) | | 11 lbs. |
| 4. | Anti Foam (Nopco NDW, Nopco Chemical Company) | | 1 lb. |
| 5. | Propylene glycol | | 180 lbs. |
| 6. | Rutile Titanium Dioxide (Tronox CR-800) | | 275 lbs. |
| 7. | 44–45% aqueous acrylic latex emulsion (Rhoplex AC-490) | | 550 lbs. |
| 8. | Anti Foam (Nopco NDW) | | 1 lb. |
| 9. | Anionic Wetting Agent (Triton GR-7) | | 2 lbs. |
| 10. | Aqueous solution containing 2% of a mixture comprising 60 parts of Heteropolysaccharide-7 with 40 parts of high viscosity sodium alginate. | | 50 lbs. |

After blending of the above ingredients to form a paint, the paint had an initial viscosity of 79 krebs units and a viscosity after 72 hours of 84 krebs units. The initial 60° gloss of the paint was 50 units, its brushing properties were rated excellent and its flow and leveling properties were rated good.

EXAMPLE XVIII

A vinyl-acrylic interior paint was prepared using the same ingredients and mixing procedure as in Example XI with the exception that in lieu of the 100 lbs. of the 2% solution of Heteropolysaccharide-7, there was employed 100 lbs. of an aqueous solution containing 2% by weight of a 60:40 weight mixture of the heteropolysaccharide with high viscosity sodium alginate. The resulting paint had the following initial properties:

Viscosity — 79 krebs units
Weight per gallon — 10.89 lbs.
Brushing — excellent
Flow and leveling — good.

After aging at ambient room temperature for 96 hours, the paint had undergone no change in its viscosity or pH and its brushing properties were rated excellent and its flow and leveling properties were rated good. This demonstrated the stability of the paint.

The paints of our invention, as described above, are compatible with the inclusion of synthetic and natural organic resins. Thus, our paints include paints in which the binder is a mixture of a latex, as described previously, with synthetic or natural organic resins. Thus, for example, from about 5 to about 65 percent of the total binder solids can be made up of synthetic or natural organic resins with the balance being latex solids. These organic synthetic and natural resins are known materials and include, for example, linseed oil, soya alkyds, tall oil alkyds, fish oils, china wood oil, malinated tall oil alkyds and the like.

Any departure from the above description which conforms to the present invention is intended to be included within the scope of the claims.

What is claimed is:

1. A water base paint comprising a latex rubber-like water base paint binder, a pigment, an aqueous vehicle for said binder and pigment, and containing a small quantity of Heteropolysaccharide-7 in an effective amount sufficient to give said paint pseudoplastic properties.

2. The water base paint of claim 1 wherein said Heteropolysaccharide-7 is present in an amount ranging from about 0.01 to about 8% by weight of the total weight of said paint.

3. The water base paint of claim 1 wherein said Heteropolysaccharide-7 is present in an amount ranging from about 0.2 to about 0.7% by weight of the total weight of said paint.

4. The water base paint of claim 1 wherein said binder is a synthetic latex.

5. The water base paint of claim 4 wherein said binder is a polyvinyl acetate emulsion.

6. The water base paint of claim 4 wherein said binder is an acrylic emulsion.

7. The water base paint of claim 4 wherein said binder is a styrene-butadiene emulsion.

8. The water base paint of claim 1 including a water-soluble alginate, wherein the weight ratio of said Heteropolysaccharide-7 to said water-soluble alginate ranges from about 3 to 1 to about 1 to 3.

9. The water base paint of claim 8 wherein said water soluble alginate has a viscosity of about 50 to about 1,800 centipoises in a 1% aqueous solution in deioninzed water.

10. The water base paint of claim 9 wherein said water-soluble alginate is sodium alginate.

11. The water base paint of claim 9 wherein said Heteropolysaccharide-7 is present in an amount ranging from about 0.01 to about 8% by weight of the total weight of said paint.

12. The water base paint of claim 9 wherein said binder is a synthetic latex.

13. The water base paint of claim 12 wherein said binder is a polyvinyl acetate emulsion.

14. The water base paint of claim 12 wherein said binder is an acrylic emulsion.

15. The water base paint of claim 12 wherein said binder is a styrene-butadiene emulsion.

16. In a process for forming a water base paint comprising a latex rubber-like water base paint binder, a pigment, and an aqueous vehicle for said binder and pigment and including forming a pigment grind of said pigment and water prior to addition of said latex binder, the improvement comprising adding a small quantity of Heteropolysaccharide-7 to said pigment grind and thereafter grinding said pigment, whereby the time required to obtain optimum dispersion of the pigment is reduced.

17. The process of claim 16 wherein the quantity of said Heteropolysaccharide-7 added to said pigment grind ranges up to about 12 pounds per 100 gallons of said pigment grind.

18. The process of claim 17 including the step of adding to said pigment grind a finely divided water-soluble alginate.

19. The process of claim 18 wherein said finely divided water-soluble alginate has a viscosity in a 1% aqueous solution from about 50 to about 1,800 centipoises in deionized water.

20. The process fo claim 18 wheren said water-soluble alginate is a high viscosity sodium alginate, having a viscosity in a 1% aqueous deionized water solution ranging from about 800 to about 1,000 centipoises.

* * * * *